United States Patent [19]

Stephens

[11] 4,438,539
[45] Mar. 27, 1984

[54] ACTUATOR FOR GENERATING TOOL HEAD

[75] Inventor: Raymond A. Stephens, Sterling Heights, Mich.

[73] Assignee: The Valeron Corporation, Troy, Mich.

[21] Appl. No.: 321,251

[22] Filed: Nov. 13, 1981

[51] Int. Cl.$^3$ .............................................. B23G 1/26
[52] U.S. Cl. .............................................. 10/120.5 R
[58] Field of Search ............... 10/96 T, 120.5 R; 82/1.2, 2 E, 1.4; 74/89.15

[56] References Cited

U.S. PATENT DOCUMENTS

| | | |
|---|---|---|
| 2,130,181 | 9/1938 | Hogg .............................. 10/120.5 R |
| 2,269,641 | 1/1942 | Woytych . |
| 2,556,742 | 6/1951 | Strickland ...................... 10/120.5 R |
| 3,165,768 | 1/1965 | Herbkersman . |
| 3,884,590 | 5/1975 | Skrentner et al. . |
| 4,313,367 | 2/1982 | Weyer . |

Primary Examiner—Lowell A. Larson
Attorney, Agent, or Firm—Gordon K. Harris, Jr.

[57] ABSTRACT

A motion conversion apparatus is disclosed having particular utility as a tool carrier actuator in a rotating taper thread generating tool head, wherein a plurality of tool carriers are moved axially of the workpiece and simultaneously transversly of the axis to form a tapered thread at the end of the workpiece. A portion of the actuating apparatus is mounted coaxially with a housing for the tool head and includes an inner and an outer actuating bar coupled together by helical keys and mating keyways such that relative axial motion between the inner and outer bars produces rotating movement of the outer bar. Rotation of the outer actuating bar is transferred to an actuating drum which has an outer surface having at least one helical keyway formed therein. In one embodiment, the actuating drum is a separate component rotating with the outer actuating bar via key-keyway pairs. A driven sleeve surrounds a portion of the actuating drum and is keyed to the helical keyway in a manner such that a given rotation of the drum produces a proportional axial linear movement by the sleeve.

18 Claims, 4 Drawing Figures

ACTUATOR FOR GENERATING TOOL HEAD

BACKGROUND OF THE INVENTION

1. Field of the Invention

The invention is generally related to motion conversion apparatus. More particularly, the invention is concerned with tool slide actuation in a generating tool head wherein at least one tool point is capable of simultaneous axial and transverse motion relative to a work surface on which tapered threadforms are to be generated. 2.

Description of the Prior Art

While the invention is useful in a variety of mechanical systems, it is described herein for use with a taper thread generating head coupled to the spindle assembly of a pipe threading machine tool system. Such threading systems are known and are set up to perform the general overall task of generating an external tapered thread at the end of pipe sections appropriately chucked in substantial axial alignment with the generating head. As the housing of the tool head is advanced axially of the pipe section, or other workpiece, thread cutting elements are moved axially as well as radially, or transversely, of the toolhead axis to thereby generate a thread form which gradually tapers outwardly such that the maximum depth of cut occurs at the end of the pipe or workpiece first engaged by such cutting elements. At the end of the cutting stroke, or threading pass, the cutting elements must be further moved transversely of the tool head housing axis to provide clearance between the pipe or workpiece and the cutting elements as the tool head is backed away to a restart position for the next pipe or workpiece to be threaded.

The motion conversion apparatus employed in these prior art thread generating heads typically comprises complicated camming elements, often requiring a separate camming mechanism for converting axial to transverse motion for each of a plurality of cutting tool holders associated with the generating head. Providing separate mechanisms for each holder may lead to component matching problems preventing uniformity of movement of each cutting element with respect to the workpiece. Additionally, the linear or arcuate camways and associated cam followers of the prior art motion conversion apparatus are often unsuited for the higher speeds and feeds which may be typically employed with carbide cutting elements.

The most pertinent prior art known to applicant is set forth in the disclosures of the following United States Letters Patent:

U.S. Pat. No. 2,054,028, Benninghoff, Sept. 8, 1936
U.S. Pat. No. 3,812,548, Theuerkaue, May 28, 1974
U.S. Pat. No. 3,129,445, Jennings, April 21, 1964
U.S. Pat. No. 3,254,548, Gersch, June 7, 1966
U.S. Pat. No. 3,286,556, Reynolds et al., Nov. 22, 1966
U.S. Pat. No. 3,443,458, Ohrnberger et al., May 13, 1969
U.S. Pat. No. 4,004,332, Wawrzniak, Jan. 25, 1977
U.S. Pat. No. 4,040,315, Bellingham, Aug. 9, 1977
U.S. Pat. No. 4,066,380, Beck et al., Jan. 3, 1978

It will therefore be seen that there is a need in the pertinent art field for a motion conversion mechanism capable of smoothly converting mechanical motion of cutting elements of generating heads capable of use with a variety of machine tool spindle assemblies at relatively higher feeds and speeds than in the past, and capable of being relatively easily manufactured and assembled. Further, a review of the prior art demonstrates a need for such apparatus that is capable of being at least manually adjustable as to its produced results without complicated disassembly of many of the components of the apparatus being required.

SUMMARY OF THE INVENTION

With an object of overcoming deficiencies in the prior art, actuating apparatus is disclosed for use, for example, with a generating head coupled to the spindle assembly of a machine tool. A three or four piece coaxially mounted novel assembly of components converts movement of an input member to a proportional movement of an output member. The input member is coupled to one of an inner actuating bar and an outer actuating bar, the inner and outer bars coupled together via mating helical actuating surfaces, such that relative axial linear motion between the inner and outer bars produced by movement of the input member produces rotational movement about its longitudinal axis by the outer actuating bar. The outer actuating bar has means at an outer surface thereof for driving a coupling element or key with an axially linear motion proportional to the rotation of the outer bar. The output member is provided this proportional linear motion by mounting the coupling element key in an inner surface of the output member which coaxially surrounds a portion of the means at the outer surface of the outer actuating bar.

In a preferred use of the invention, the means at the outer surface at the outer actuating bar comprises a separate actuating drum keyed for rotation with the outer actuating bar. The actuating drum has at least one helical slot or keyway in which at least one key protruding from an inner surface of the surrounding output member is slidingly engaged. Alternate keyways in the actuating drum may be provided such that different axially linear movements proportional to drum rotation may be appropriately preselected by proper positioning of the key coupling the output member to the drum. By providing a separate actuating drum, the outer actuating bar may move axially as well as rotationally, while the actuating drum may be held against axial movement.

In the preferred taper thread generating head disclosed herein, the above summarized apparatus comprises a portion of an actuator for a plurality of cutter carrying tool blocks which simultaneously move axially and radially of a workpiece being taper turned and threaded in a single pass along the workpiece. The output member has a keyway extending circumferentially about an outer surface of the output member and is keyed therefrom to a plurality of crank actuator bars extending substantially parallel to the axis of the head and workpiece. Each actuator bar is, in turn, coupled to a corresponding tool slide via a bell crank mechanism in a manner such that axial motion of the actuator bars imparted thereto by the output member causes each tool slide to move a proportional distance transverse to the axis of the head and workpiece. In a more specific preferred form, an even number of tool slides are provided, with every other slide driving a tool block mounting a circular taper turning cutting insert axially leading a multi-tooth thread chasing cutting insert. The remainder of the tool slides drive a tool block mounting only a circular taper turning insert.

BRIEF DESCRIPTION OF THE DRAWING

The objects and features of the invention will become apparent from a reading of a detailed description of a preferred embodiment, taken in conjunction with the accompanying drawing in which.

DETAILED DESCRIPTION OF A PREFERRED EMBODIMENT

Figure 1:
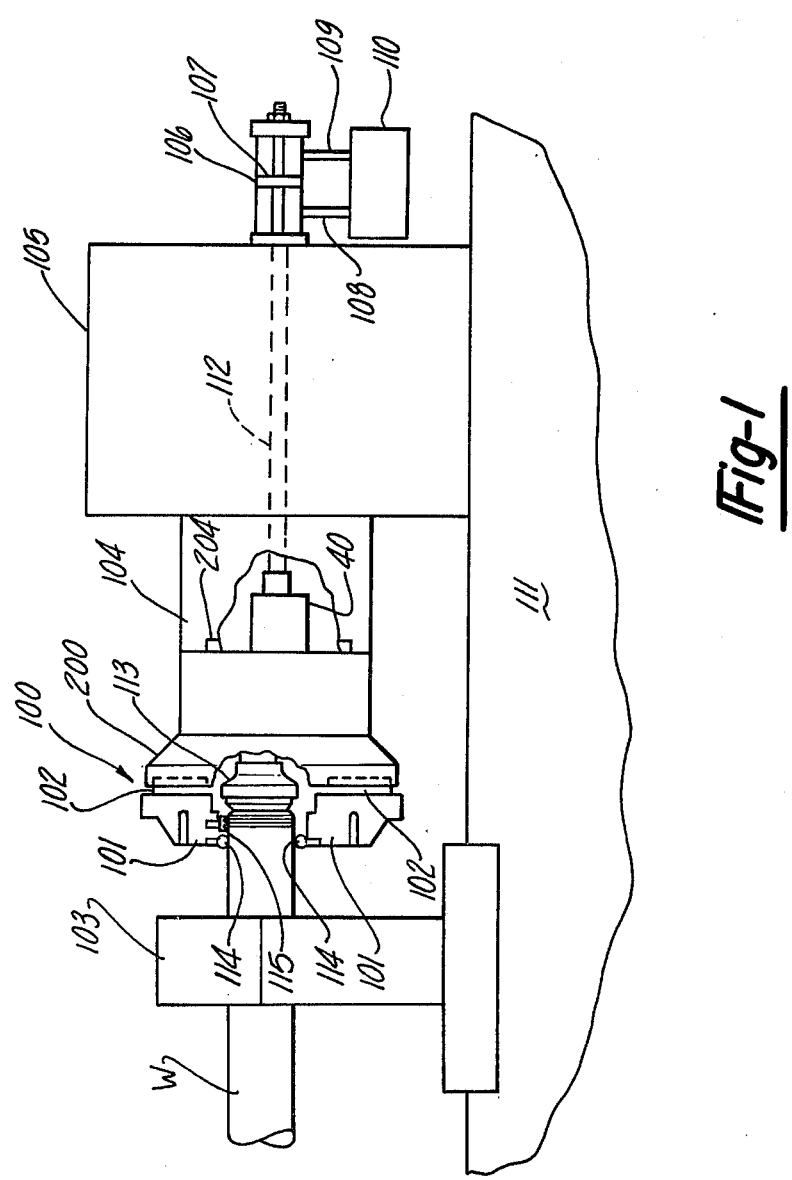
FIG. 1 is a side elevation of a machine tool system with a combined taper turning, thread generating head utilizing the present invention.

For clarifying consistency, the same reference numerals are applied to the same components throughout the drawing figures.

With reference to FIG. 1, a machine tool system is depicted for utilizing a tapered thread generating head 100 incorporating the novel apparatus of the invention. To a base 111 of the system is mounted a spindle carriage and drive component 105, which includes appropriate horizontal ways (not specifically shown) for reciprocating movement of spindle assembly 104 and the head 100 coupled thereto. Component 105 additionally includes a suitable drive motor (not specifically shown) for spindle assembly 104. Also mounted to base 111 is a suitable chucking mechanism 103 for clamping a workpiece, such as a circular pipe W, in substantially axial alignment with the longitudinal axis of housing 200 of head 100.

At an end facing workpiece W, head 100 has mounted thereto a plurality, e.g. six, of tool slides 102 each carrying a tool holder 101 in radially, i.e. transversely of the axis of head 100, sliding fashion. Every other tool holder 101 carries a circular taper turning cutting insert 114 followed by a multi-toothed thread chaser cutting inser 115 in substantial axial alignment with its corresponding preceeding insert 114. The remainder of the tool holders 101 carry only a taper turning circular inser 114. For illustrative purposes, one of each type tool holder is depicted in FIG. 1, the dual insert type shown above workpiece W, and the single insert type shown therebelow.

Axially aligned with workpiece W is a stop collar 113 coupled to the actuating apparatus inside housing 200 of head 100, such apparatus to be described in further detail in a later portion of this description.

A pilot portion 204 of head 100 extends into hollow spindle assembly 104. Also extending into the interior chamber of spindle 104 is one end of the coaxially mounted portion 40 of the acutating apparatus of the invention. Coupled to portion 40 is a drawbar 112, in turn coupled to a piston rod of piston 107 which reciprocates within hydraulic cylinder housing 106 under the control of hydraulic control circuit 110 coupled to cylinder 106 via hydraulic conduits 108 and 109.

In general operation, spindle carriage and driver 105 advances spindle assembly 104 and head 100 axially toward workpiece W while simultaneously rotating spindle 104 and head 100 about a longitudinal axis in substantial alignment with that of workpiece W. Upon engagement of the end of workpiece W by stop collar 113, carriage 105 continues to move the housing 200 of head 100 axially along workpiece W and collar 113 imparts the necessary input motion to actuating apparatus 40 to initiate a simultaneous radial, or transverse, movement to tool slides 102 as the tool carriers 101 move axially along the outer surface of workpiece W. Hence a gradually decreasing taper surface is rough turned by inserts 114 and a thread form is generated thereon by following chaser inserts 115. At the conclusion of the combined taper turning-thread generating pass, carriage 105 halts axial movement of housing 200. At this point, control 110 causes hydraulic cylinder 106 to force piston 107 and connected drawbar 112 a predetermined distance towards apparatus 40 thereby effecting further transverse or radial movement of slides 102 in an amount sufficient to provide suitable clearance between all cutting inserts 114, 115 and the exterior surface of workpiece W as the head 100 is axially retracted to a starting position in preparation for initiating a subsequent machining pass along a new workpiece. The manner in which motion of drawbar 112 against apparatus 40 produces transverse motion of slides 102 will be described in a later portion of this description.

While the invention is illustrated in conjunction with a system as abovedescribed, it will be apparent to those skilled in the art that apparatus designed in accordance with the principles of the invention could also be adapted for use with a stationary generating head engaging a rotating workpiece. Likewise, such apparatus could be adapted for taper threading of an interior surface of a workpiece. Additionally it should also be appreciated tht the invention is easily adapted for use with a variety of actuating mechanisms for drawbar 112, be they hydraulic of electrical in nature.

Figure 2:
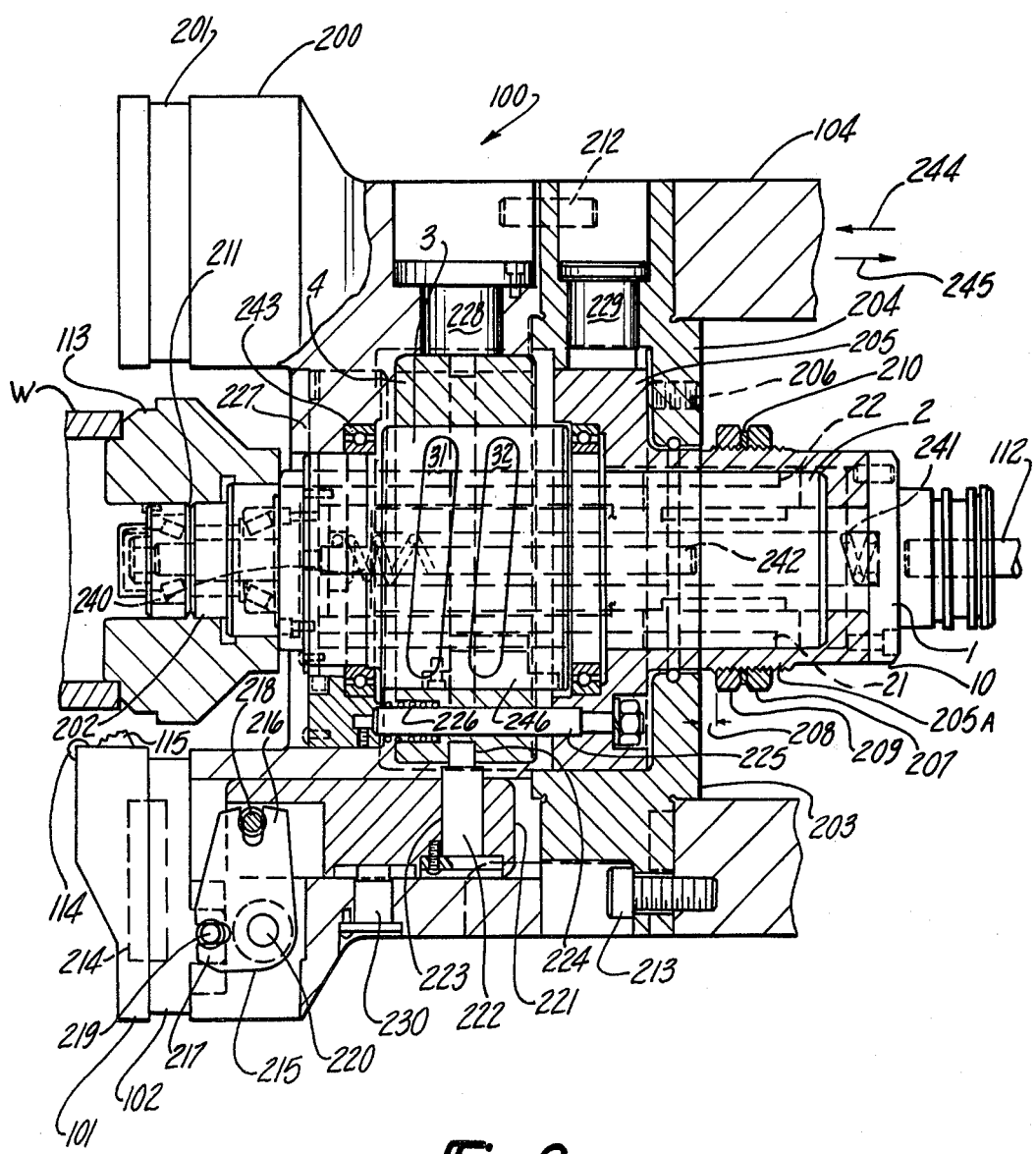
FIG. 2 is a partial sectional view of the generating head depicted as part of FIG. 1, taken normal to the longitudinal axis of the head housing.
Figure 3:
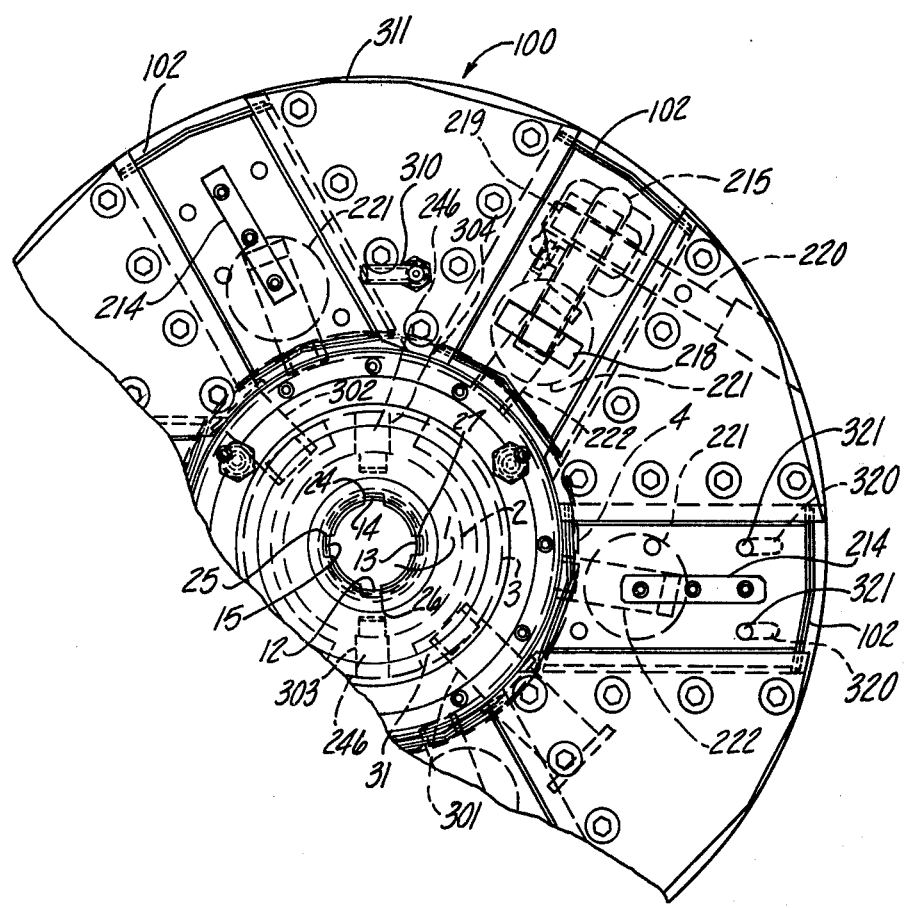
FIG. 3 is a partial end view along the axis of the generating head of FIG. 2 from the tool mounting end thereof with certain elements shown in FIG. 2 deleted for clarity.
Figure 4:
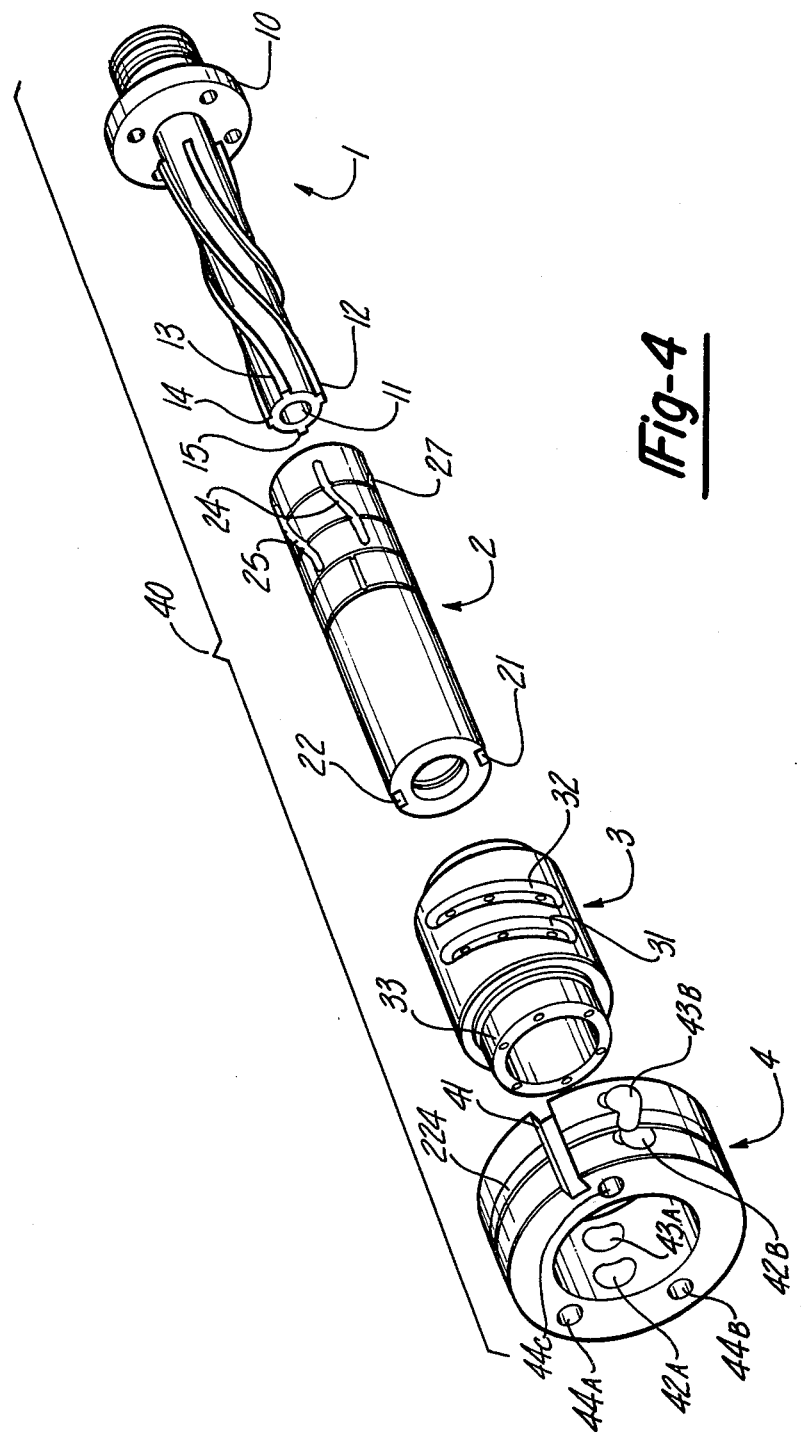
FIG. 4 is an exploded perspective view of the coaxially mounted portion of the actuator apparatus shown operatively mounted within the generating head of FIGS. 2 and 3.

With reference now to FIGS. 2, 3 and 4, the structure and mounting relationship to the head housing of the actuator for the tool slides 102 will be described in more detail.

Housing 200 of head 100 is provided with a frontal portion of enlarged diameter containing a plurality (e.g. 6) of tool slides 102 each slidingly carrying a tool holder 101 on a radially extending slideway 201 and coupled to each tool holder 101 via a thrust key 214.

Coaxially mounted to head 100 at the tool holder end thereof, is stop collar 113 attached to a bearing housing 202 at groove 211 via suitably shaped cone point screws (not specifically shown).

At an opposite end of heat 100 is provided a spindle pilot portion 204 with an axial rearward extension adapted to engage the interior hollow portion of spindle assembly 104. A flanged section of pilot portion 204 is coupled to the spindle shaft 104 via a plurality of bolts 213, one of which is shown in the view of FIG. 2.

Slidingly mounted coaxial to and within an internal cavity of spindle pilot portion 204 is a tail section 205 having a threaded extension 205A protruding from a bore in rear wall 208 of pilot portion 204. Threaded to extension 205A is a pair of stop nuts 207, 209 separated by washer 210. Tail section 205 is keyed for rotation with spindle pilot portion 204 via key 229, while spindle pilot portion 204 causes housing 200 to rotate with portion 204 via a plurality of dowel pins 212, one of which is shown in the view of FIG. 2.

The coaxially mounted portion 40 of the tool carrier actuating apparatus, comprises an inner actuating bar 1 having a flanged end portion 10 coupled to tail section extension 205A. Mounted in an inner axial bore 11 of bar 1 are springs 240 and 241 and spring pilot 242. Spring 241 bears against flanged portion 10 of bar 1, while spring 242 bears against an end cap portion of bearing retainer 227.

Slidingly mounted around inner actuating bar 1 is an outer actuating bar 2. As best seen from FIG. 3 and FIG. 4, outer bar 2 has four helical keyways 24, 25, 26, 27 shaped for mating engagement respectively with helical keys 14,15,12 and 13 protruding from inner actuating bar 1. A forward end of bar 2 abuts against bearing housing 202 such that axial movement of stop collar 113 is transmitted via slidingly mounted housing 202 to outer actuating bar 2. Surrounding a portion of outer actuating bar 2 is an actuating drum 3, which is mounted for rotation with outer bar 2 via a pair of keys 246, one of which is shown in the view of FIG. 2. Keys 246 are slidable in keyways 21 and 22 (FIG. 4) of bar 2 and are captively mounted in cavities 303 and 304 formed in an inner surface of actuating drum 3 (FIG. 3). Actuating drum 3 is mounted for substantially frictionless rotation within housing 200 via bearings 243, which ride on extensions 33 of drum 3.

The outer surface of drum 3 is provided with 2 pairs of helical slots or keyways 31 and 32 (only one slot of each pair being visible in FIGS. 2 and 4). The helix angle for pair 31 is different from that for pair 32 for purposes to be explained later.

Keyed to one of the two pairs of helical keyways 31, 32 is an outer driven sleeve, or output member, 4 via a pair of identical keys 301 and 302 (FIG. 3) housed in cavities 42A and 42B of sleeve 4 whenever used with keyway pair 31, or housed in cavities 43A and 43B whenever used with keyway pair 32. Sleeve 4 is keyed for rotation with housing 200 via key 228 slidingly engaging keyway 41 of sleeve 4 (FIG. 4).

Three bearing pre-load bars 225 (one of which is shown in the view of FIG. 2) extend from tail section 205 through bores 44A, 44B and 44C of sleeve 4 (FIG. 4) into bearing retainer 227. Each preload bar 225 is biased by a spring 226.

Extending circumferentially about an outer cylindrical surface of sleeve 4 is an output keyway 224 shaped for receipt of a plurality (e.g. 6) of keys 222 protruding from associated crank actuator bars 221. Keys 222 are held substantially immobile with respect to bars 221 via key-receiving cavities 223. As seen from FIG. 2, crank actuator bars 221 are slidingly mounted in housing 200 substantially parallel to the axis thereof. Each crank actuator bar is keyed for rotation with housing 200 via keys 230. At an end opposite to that keyed to the sleeve 4, each crank actuator bar 221 is coupled via a first axle pin 218 to a first portion 216 of actuating arm 215. Actuating arm 215 is pivotally mounted to housing 200 via main axle 220. Each tool slide 102 is coupled to a second portion 217 of actuating arm 215 via a second axle pin 219. Actuating arm 215 with its associated main axle and slotted arm portions is seen to comprise a conventional bell crank mechanism.

Workpieces of varying diameters can be accommodated by the generating head 100, due to the adjustable mounting arrangement of tool slides 102 to housing 200, best shown in FIG. 3, an end view of the generating head in which the tool holders 101 are not shown for a clearer presentation of the apparatus mounted axially rearwardly of the tool holders 101. As seen from FIG. 3, each tool slide 102 is mounted to tool head housing 200 by means of screws 321 in a manner in which the initial setting of each slide 102 is made radially adjustable by provision of elongate screw receiving slots 320 in housing 200.

Also seen in FIG. 3 are generally pie segment shaped cover plates 311 mounted between each pair of tool slides 102 at the forward end of tool head housing 200. Appropriately positioned on each cover plate 311 is a fitting 310 arranged for directing lubricating fluid toward each tool slide.

With the preferred structural arrangement set forth above, the operation of the actuator mechanism may be summarized as follows.

Upon axial movement of generating head 100 towards the workpiece W by spindle carriage 105, stop collar 113 comes into contact with the end of workpiece W. Continued axial motion of housing 200 therefore results in the outer actuating bar 2, which, via bearing housing 202 and bearing retainer 227, is responsive to pressure on collar 113, to move axially rearwardly with respect to inner actuator bar 1. Such rearward axial movement of bar 2 results in rotation of bar 2 due to the helical interaction surfaces provided by keys 12,13,14,15 respectively engaging keyways 26,27,24,25 of outer actuator bar 2.

In response to rotating movement of outer actuator bar 2, actuating drum 3 likewise rotates due to keys 246 protruding from cavities 303 and 304 of drum 3 and slidingly engaging keyways 21 and 22 of outer bar 2. While outer bar 2 is mounted for sliding axial motion with respect to housing 200, drum 3 is not. Hence relative axial movement of bar 2, combined with rotational movement of bar 2, is translated into solely rotational movement of drum 3 with respect to housing 200.

Keys 301 and 302 (FIG. 3) positioned in one of the two pairs of helical slots 31 or 32 of drum 3, impart linear axial movement to sleeve 4 upon rotation of drum 3. The linear axial movement of sleeve 4 is, in turn, transferred to each of the plurality of crank actuator bars 221 via keys 222, keyway 224, in sleeve 4 and key receiving cavities 223 in each crank actuator bar 221. In the preferred embodiment, at least two pairs of keyways, each with a different helix angle, are provided so that the user may manually select one of two available tapers by appropriately inserting keys 301 and 302 into a preselected keyway pair.

Hence to this point of the description, housing 200 has been moved in a direction shown by arrow 244 (FIG. 2) with respect to workpiece W, thereby likewise axially moving inserts 114 and 115 of each tool carrier 101 axially along workpiece W. Additionally, due to the cooperating movement of the various elements of the coaxial portion 40 of the actuating mechanism of the invention, sleeve 4 has been simultaneously axially moved a distance determined by the combination of the relative axial movement between actuating bars 1 and 2, and the rotational movement of actuating drum 3, along with the pre-chosen pair of helical keyways 31 or 32 in the actuating drum 3.

The axial movement of sleeve 4 is converted into radial or transverse, movement of each tool slide 102 via the bell crank mechanism associated with each crank actuator bar 221 keyed to sleeve 4. Hence inserts 114, 115 of alternate tool carriers 101, and insert 114 of the remaining tool carriers are simultaneously moved axially and radially, or transverse to the axis, of the workpiece W to generate a desired tapered thread. To summarize, relative axial linear motion of bars 1 and 2 is converted to solely rotational movement of drum 3, which, in turn, is converted via keyways 31 or 32 to linear axial motion of sleeve 4. Axial motion of sleeve 4 is, in turn, converted to motion substantially transverse to the axis of head 100 by bell crank mechanisms each comprised of elements 215, 216, 217, 218, and 219 actuated by bars 221, in turn driving each of the plurality of tool slides 102 and their associated tool carriers 101 via thrust keys 214.

Hence the coaxially mounted apparatus 40, in combination with the motion converters comprising actuator bars 221 and associated bell crank mechanisms 215, 216, 217, 218, 219, produces transverse motion of tool slides 102 proportional to axial motion of the housing 200 relative to the workpiece by an amount determined by (a) the helix angle of the key-keyway surfaces of actuator bars 1 and 2, (b) the helix angle of the keyways 31 or 32 on the outer surface of drum 3, and (c) the mechanical advantage provided by the bell crank mechanism. By providing more than one pair of helical keyways on the outer surface of actuating drum 3, the proportional transverse motion of tool slides 102 can be manually preselected by placing keys 301, 302 in keyways 31 or keyways 32, each having a different helix angle.

At the end of the combined taper turning and threading operation along the outer surface of workpiece W, movement of housing 200 in the direction indicated by arrow 244 (FIG. 2) is stopped by spindle carriage 105. Prior to retraction of housing 200 away from workpiece W in the direction of arrow 245 (FIG. 2), each insert 114, or inserts 114 and 115 as the case may be, of tool carriers 101 must be moved away from the outer surface of workpiece W by an amount sufficient to provide clearance between all cutting inserts and workpiece W as housing 200 is axially withdrawn from workpiece W. Such clearance is provided as follows.

At the completion of the combined taper turning and threading stroke of housing 200 in the direction of arrow 244, housing 200 is held stationary with respect to workpiece W by spindle carriage 105 while control circuit 110 causes hydraulic cylinder 106 to force piston 107 toward head 100, as viewed in FIG. 1. Such movement of piston 107, in turn, via draw bar 112, forces inner actuating bar 1 to axially move tail section 205 in the direction of arrow 244, via flanged portion 10. Such axial movement of tail section 205 is, in turn, transmitted to sleeve 4, which, via bars 221 and crank actuating arms 215, further moves tool slides 102 radially outwardly of the workpiece an amount sufficient to provide the desired clearance, while housing 200 is being held stationary with respect to workpiece W. The amount of movement of tail section 205 produced by corresponding movment of drawbar 112 is governed by rear wall 203 of pilot portion 204 in conjunction with a surface on stop nut 209 facing wall 203. The position of stop nut 209 relative wall 203 determines distance 208 (FIG. 2), the length of the retract stroke of drawbar 112.

After such sufficient radial, or transverse, clearance has been so provided, housing 200 can be retracted in the direction of arrow 245 (FIG. 2) by spindle carriage 105. Either simultaneously or subsequent to this axial retract movement of housing 200, control 110 causes hydraulic cylinder 106 to force piston 107 rearwardly of head 100, which, in turn, causes inner bar 1 and tail section 205 to move axially rearwardly until tail section 205 comes to rest against a plurality of stop members 206, comprised of set screws housed in pilot portion 204, one screw 206 being shown in the view of FIG. 2. At this time, the generating head cutting elements have been repositioned, or initialized, in preparation for taper threading of a new workpiece.

The invention has been described above in an illustrative embodiment for the sake of example only. Alternative approaches using the principles of the invention will be apparent to those skilled in the art. For example, one alternative approach would be to couple the inner actuating bar 1 to the stop collar 113 to produce relative movement between bars 1 and 2 upon contact of the workpiece by stop collar 113. In such an arrangement, where outer actuating bar 2 could be constrained against axial movement relative housing 200, actuating drum 3 could be combined with bar 2 as an integral unit resulting in only 3 detachably coupled elements or members comprising apparatus 40.

As a further alternative approach, apparatus 40 (FIG. 4) could be used to convert rotary motion of an input member such as housing 200, to proportional rotary motion by the sleeve or output member 4. Thus two types of motion, rotary or linear, may be used as inputs to the apparatus of the instant invention.

Further alternatives will be suggested to those skilled in the art by the teachings set forth herein. The invention is to be limited solely by the scope and spirit of the appended claims.

What is claimed is:

1. Apparatus for moving an output member in response to movement of an input member comprising:
   first and second members;
   means coupling at least one of the first and second members to the input member for providing relative linear movement between the first and second members in response to movement by the input member;
   means for imparting rotary movement to the second member in response to the relative linear movement, the means for imparting rotary movement comprising at least one helical key protruding from one of the first and second members and at least one helical slot in the other of the first and second members matingly engaging at least a portion of the at least one helical key; and
   means for imparting linear movement to the output member in response to a rotary movement by the second member.

2. Apparatus as set forth in claim 1 wherein the means for imparting linear motion to the output member comprises:
   a generally cylindrical key;
   at least one helical keyway formed in one of the second and output members and at least one cavity formed in the other of the second and output members, the helical keyway slidingly receiving one end of the key, and the cavity matingly receiving another end of the key in substantially non-moving fashion.

3. Apparatus as set forth in claim 1 wherein the second member comprises first and second portions movable relative to each other, the at least one helical key protruding from one of the first and the first portion of the second members and the at least one helical slot positioned in the other of the first and the first portion of the second members.

4. Apparatus as set forth in claim 3 further comprising means for imparting only rotary motion to the second portion of the second member in response to combined linear and rotary motion of the first portion of the second member, the means for imparting linear movement to the output member including a generally cylindrical key, at least one helical keyway formed in one of the second portion of the second and the output members, at least one cavity formed in the other of the second portion of the second and the output members, the helical keyway slidingly receiving one end of the generally cylindrical key, and the cavity matingly receiving another end of the cylindrical key in substantially non-moving fashion.

5. In a toolhead for moving at least one tool carrier relative to a workpiece in directions both parallel and transverse to an axis of the head in response to axial movement of a head housing relative to the workpiece, tool carrier actuating means comprising:
- first, second and output members;
- means coupled to one of the first and second members and positioned for abutting engagement with the workpiece operative to produce relative axial movement between the first and second members upon relative axial movement between the housing and the workpiece;
- means for imparting rotary movement to the second member in response to the relative axial movement between the first and second members comprising at least one helical key protruding from one of the first and second members and at least one helical slot in the other of the first and second members matingly engaging at least a portion of the at least one helical key;
- means for imparting linear axial movement to the output member in response to the rotary movement of the second member; and
- motion conversion means coupled between the output member and the at least one tool carrier operative to generate movement of the tool carrier in a direction transverse to the head axis by an amount proportional to the axial movement of the output member.

6. The actuating means of claim 5 wherein the means for imparting linear axial movement to the output member comprises at least one generally cylindrical key, at least one helical keyway formed in one of the second and output members, at least one cavity formed in the other of the second and output members, the helical keyway slidingly receiving one end of the key, and the cavity matingly receiving another end of the key in substantially non-moving fashion.

7. The actuating means of claim 5 wherein the second member comprises first and second portions movable relative to each other, the at least one helical key protruding from the first member, and the at least one helical slot formed in the first portion of the second member.

8. The actuating means of claim 7 further comprising means for imparting only rotary motion to the second portion of the second member in response to combined linear axial and rotary motion of the first portion of the second member, the means for imparting linear axial movement to the output member including at least one generally cylindrical key, at least one helical keyway formed in the second portion of the second member, at least one cavity formed in the output member, the helical keyway slidingly receiving one end of the generally cylindrical key, and the cavity matingly receiving another end of the cylindrical key in substantially non-moving fashion.

9. The actuating means of claim 5 wherein the output member includes an outer surface containing an output keyway, and wherein the motion conversion means further comprises:
- a connecting link having a link keyway formed therein;
- an output key engaging the output and link keyways for producing linear axial motion of the connecting link in repsonse to linear axial motion of the output member;
- slide means carrying the at least one tool carrier and coupled to the housing for relative motion transverse to the axis thereof; and
- pivotally mounted crank means having a first portion coupled to the connecting link and a second portion coupled to the slide means, operative to pivot in response to axial linear motion of the connecting link to cause movement of the slide means transverse to the axis of the housing.

10. The actuating means of claim 5 further comprising retract means coupled to one of the first and second members for imparting additional relative axial movement to the output member while the housing is stationary relative the workpiece.

11. In a thread generating tool head having at least one tool carrier for generating tapered threads on a workpiece as a head housing and the workpiece are given relative rotational and axial movements, improved tool carrier actuating means comprising:
- an inner actuating bar movably supported in and having an axis substantially coincident with the axis of the housing, the inner actuating bar having helical actuating surfaces formed thereon;
- a hollow cylindrical outer actuating bar having an inner surface surrounding at least a portion of the inner actuating bar and including helical actuating surfaces slidingly engaging the helical actuating surfaces of the inner bar, the respective engaging helical surfaces operative to cause rotating movement of the outer bar in response to relative axial movement between the inner and outer bars;
- a stop member slidingly mounted in the housing, coupled to one of the inner and outer actuating bars, and positioned for abutting engagement with the workpiece, operative to produce relative axial movement between the inner and outer actuating bars in response to relative axial movement between the housing and the workpiece;
- an annular actuating tumbler surrounding at least a portion of the outer actuating bar and keyed for rotation therewith about the housing axis;
- a sleeve surrounding at least a portion of the actuating tumbler;
- means for imparting linear axial movement to the sleeve in response to rotary movement of the tumbler comprising at least a first helical slot formed in one of the sleeve and the tumbler and a key slidingly engaging the first helical slot and protruding from the other of the sleeve and the tumbler; and
- motion conversion means coupled between the sleeve and the at least one tool carrier operative to generate movement of the tool carrier transverse to the housing axis by an amount proportional to the axial movement of the sleeve.

12. The improvement of claim 11 wherein the means for imparting linear axial movement to the sleeve further comprises a plurality of helical slots, each having a different helix angle and each capable of slidingly receiving the key, whereby insertion of the key into a preselected one of the plurality of slots will produce a preselected magnitude of axial movement by the sleeve upon a given rotational movement of the tumbler.

13. The improvement of claim 11 wherein the motion conversion means further comprises;
- a drawbar coupled to the sleeve for linear axial motion therewith;
- a tool slide carrying the at least one tool carrier and movably mounted to the housing for relative motion transverse to the axis thereof; and
- a bell crank pivotally mounted to the housing and having a first portion coupled to the drawbar and a second portion coupled to the tool slide, operative to pivot in response to axial linear motion of the drawbar in a manner causing movement of the tool slide transverse to the housing axis.

14. The improvement of claim 11 further comprising retract means for imparting additonal axial movement to the sleeve independently of the relative axial movement between the inner and outer bars produced by the stop member.

15. The improvement of claim 11 further including a plurality of tool carriers, alternate carriers each having a first taper turning cutting element mounted thereon, the remainder of the plurality of carriers each having a second taper turning cutting element and a thread cutting element mounted thereon in axial alignment, each second taper turning element mounted axially forwardly of its associated thread cutting element.

16. The improvement of claim 15 wherein the first and second taper turning cutting elements comprise a substantially circular indexable cutting insert and wherein the thread cutting elements comprise multitoothed thread chasing inserts.

17. The improvement of claim 14 wherein the retract means further comprises:
- a flanged portion of the inner actuating bar;
- a push rod having one end coupled to the flanged portion;
- a tail section of the tool head slidingly mounted within the housing and positioned for abutting engagement with the sleeve for directly imparting axial motion thereto, the tail section further including a threaded extension coupled to the flanged portion;
- a pilot portion of the tool head surrounding a portion of the tail section and containing at least one stop member for preventing axial movement of the tail section rewardly of the housing beyond a first predetermined position, a bore through a rear wall of the pilot portion through which the threaded extension of the tail section protrudes;
- a stop nut threadingly engaging the extension and having a stop surface facing the rear wall of the pilot portion to prevent axial movement of the tail section forwardly of the housing beyond a second predetermined position; and
- means coupled to another end of the push rod for axially reciprocating the push rod over a range determined by the first and second predetermined positions.

18. The improvement of claim 11 wherein the at least one tool carrier includes means for adjustably mounting the tool carrier to the motion conversion means at a preselected radial distance from the axis of the housing, whereby a continuous range of workpiece diameters may be threaded by the generating tool head.

* * * * *